Feb. 5, 1963 H. A. SCHIESSL 3,076,294
COLORED STRUCTURAL GLASS
Filed Dec. 15, 1958
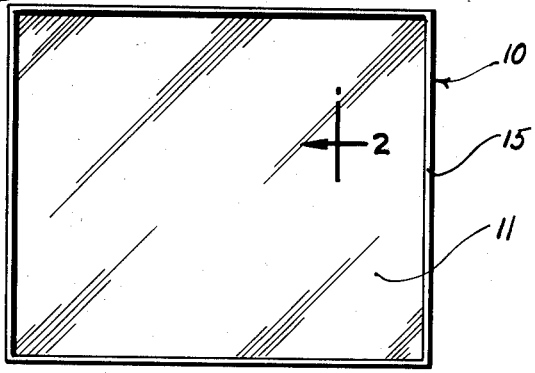
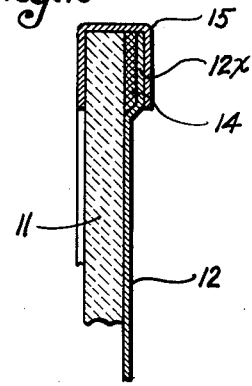
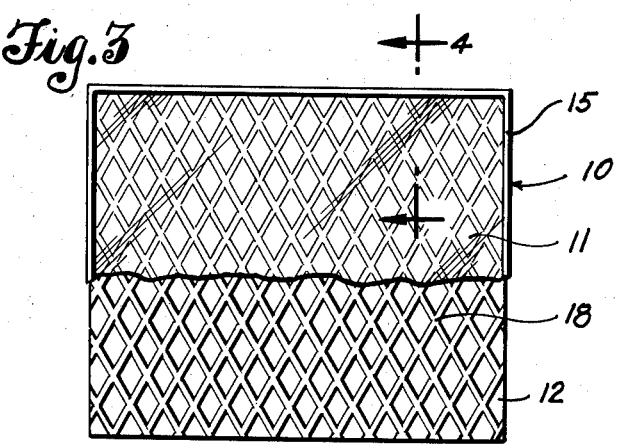
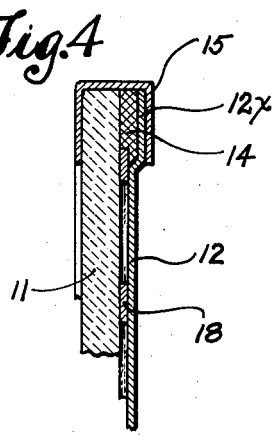
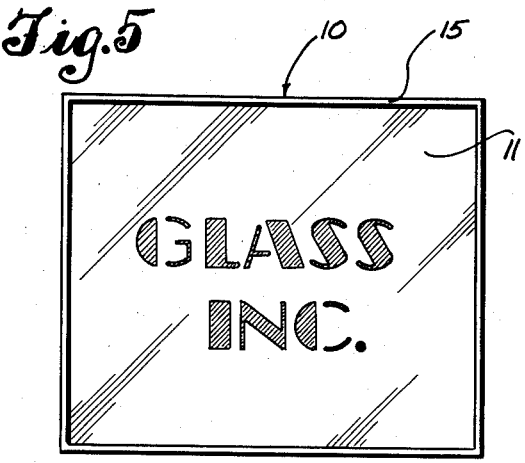
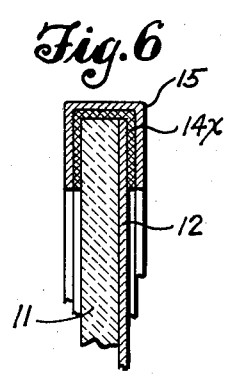
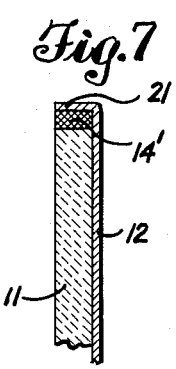
INVENTOR.
HERBERT A. SCHIESSL
BY
Robinson + Berry
ATTORNEYS

United States Patent Office 3,076,294
Patented Feb. 5, 1963

3,076,294
COLORED STRUCTURAL GLASS
Herbert A. Schiessl, 2501 Market St., Seattle, Wash.
Filed Dec. 15, 1958, Ser. No. 780,615
6 Claims. (Cl. 50—267)

This invention relates to improvements in what is generally known in the building industry as "structural glass," that is, to improvements in opaque glass panels as used for wall facings and particularly for application to exterior wall surfaces.

Explanatory to the present invention, mention will here be made of the present day use of large, opaque wall facing panels of glass, mounted in metal frames whereby they are fixed to the exterior structure of a building. Such wall facing panels generally are of plate glass, one-fourth inch thick, and of substantial dimensions. It has been a usual practice to paint the back surfaces of the glass panels in order to give them a desired opaqueness and color ornamentation.

In the use of such opaque structural glass panels as heretofore provided, damage has occurred by reason of unequal heat absorption by different areas thereof. For example, a panel as applied to the exterior surface of a building may, on occasions, be subjected to the sun's rays only on a part thereof. This particular part absorbs the heat of the sun's rays. Because of the opaqueness, this heat is not quickly dissipated and gradually builds up, while the other areas of the panel, being shaded, remain at normal temperature. The incident expansion in the heated area caused warping, cracking or shattering of the panel. Repair or replacement of a damaged panel is expensive and in some instances, is quite difficult to accomplish.

In an effort to solve this problem some manufacturers have resorted to the use of tempered or heat treated glass. This solution is expensive and the result obtained is not completely satisfactory because the heat treatment distorts the glass causing waves and other imperfections.

In view of the above explanatory statement and for various other reasons, it is the primary object of the present invention to provide improved opaque glass panels wherein backing sheets of metal or other heat conductive material are applied to the back surface of the glass so that the heat will be quickly dissipated thereby providing a means for and method of eliminating ultimate damage to the glass panel from the heat.

It is a further object of the present invention to provide structural, opaque glass panels with sheet metal backings and to insure the holding of the backing material in close, heat absorbing contact with the glass panel by vacuumizing the space between them.

Another object of this invention is to provide for the ornamentation of the structural glass panel by use of pattern or design forming spacers of metal or the like between the glass panel and the sheet metal backing panels.

Yet another object is to provide novel means for sealing the engaged perimeters of the glass panels and metal backing sheets so that a vacuum drawn between them will be permanently retained.

A further object of this invention is to seal the space between the glass panel and backing member so as to prevent dust, moisture and other elements from coming in contact with the painted surface.

Still further objects and advantages of the invention reside in the details of construction and combination of parts employed and in their assembly, as will hereinafter be described.

In accomplishing the above mentioned and other objects of the invention, I have provided the improved details of construction, the preferred forms of which are illustrated in the accompanying drawings, wherein:

FIG. 1 is a front, or face view of a structural glass panel embodied by the present invention.

FIG. 2 is an enlarged cross-sectional view, taken on line 2—2 in FIG. 1, showing the metal backing sheet as applied to the glass panel, and showing also the application of a joint sealing material between the peripheries of the glass panel and metal backing sheet.

FIG. 3 is a front view of a structural glass panel in which a pattern, or design forming metal insert is applied between the glass panel and metal backing; the lower portions of the glass panel and joining frame being broken away for purpose of better understanding of construction.

FIG. 4 is an enlarged cross-sectional detail, taken on line 4—4 in FIG. 3.

FIG. 5 is a front or face view of a structural glass panel embodied by the present invention showing the application of signs or advertising thereto.

FIG. 6 is a cross-sectional detail of the metal bound edge portion of a structural glass panel embodied by this invention, employing an alternative form of edge binding and sealed joint.

FIG. 7 is a cross-sectional detail illustrating still another method of sealing the edge joint.

Referring more in detail to the drawings:

The present structural glass panels, which preferably are of rectangular form and of substantial dimensions, are generally used to face the outside wall surfaces of buildings. However, they may be of shapes other than here shown and made in a wide variation of dimensions. From the standpoint of practicability and economy of manufacture, such panels should be rectangular since it is the intent that each shall be set in a supporting frame structure of the building and that it shall be secured therein in such manner to withstand all the usual requirements of an exterior wall surfacing unit.

In the present drawings, each of the structural glass units, as shown in FIGS. 1, 3 and 5, is designated in its entirety, by reference numeral 10. It comprises a flat, rectangular panel of plate glass 11 of the desired dimensions, to the back surface of which a metal backing sheet 12 of like width and length, is applied. As shown in FIG. 2, the metal sheet 12 is flat and is disposed flatly against the back surface of the glass panel 11. A peripheral portion 12x of uniform width and extending uninterruptedly about the metal backing sheet 12, is here shown to be outwardly offset from the corresponding peripheral portion of the glass panel 11 and the open space or channel thus provided between them is filled with a suitable joint sealing material 14, preferably a polysulphite rubber sealant. After the sealant has been applied, the edge portions of the assembled glass panel and metal sheet are clamped and retained tightly together by and between the opposite side members of a metal binding strip 15 of the channel form shown. After the glass and metal panels have been assembled, and the joint sealant applied, it is desirable, and it is one of the features of the present invention, that the space between glass and metal panels is vacuumized as a means of insuring their being forced into and then retained by external air pressure in close contact over their entire surfaces. This vacuumizing may be done in various ways but preferably by passing a tubular needle through the joint sealant 14, into the space to be vacuumized and then attaching the outer end of the needle to a vacuum pump; the needle being withdrawn when vacuumizing has been accomplished.

In order to give the panel the desired appearance of opaqueness, either the back surface of the glass panel, or the front surface of the metal panel is painted in any one of a number of selected colors and this being done, of course, before the parts are assembled.

The metal sheet 12 used in the present manufacture might be of aluminum painted in any one or more selected colors. Likewise, it might be a sheet of anodized aluminum of any designated color, or a sheet of steel, painted or unpainted. The painting of the surface of the glass panel or metal is no hinderance to heat transfer from glass to metal and furthermore, the painted surfaces will be protected against deterioration by reason of their protection against weather and by reason of the vacuumization of the panel.

The structure of the panel 10 shown in FIGS. 3 and 4 is the same as that of FIGS. 1 and 2 except it is seen to have an open pattern or design forming sheet 18 of metal applied between the glass panel 11 and metal backing sheet 12. In FIG. 3 this pattern sheet is shown to be reticulated by vertical rows of diamond shaped openings which remove a greater part of its solid area. This pattern sheet is firmly clamped between the glass panel and metal backing sheet by reason of the vacuum drawn in the panel as previously explained. In this combination or assembly of parts, it is anticipated that the pattern sheet 18 may be of a color contrasting to that of the backing sheet 12 in order to better produce an ornamental effect. For example, the backing sheet 12 might be dark green and the pattern panel in yellow thus to cause the pattern to stand out. The pattern sheet also is of a metal that readily conducts heat from the glass panel to the backing sheet 12. Tests made have proven that the disposition of the pattern sheet in the assembly has no particular effect on the quick heat transfer from the glass for its dissipation by the backing to other areas of the glass or frame structure.

In FIG. 5, I have illustrated the application of a sign or other display for advertising or otherwise, to the panel 10. This anticipates the painting or applying of the display or sign forming characters to the back or inside surface of the glass panel 11 or to the front face of the metal sheet 12. Such characters would be most effective when painted in colors that contrasts with that of the backing sheet 12.

FIG. 6 is a sectional detail showing, as an alternative joint, a sealant 14x applied immediately within the channeled binding strip 15 to enclose the peripheral portion of both the glass panel and metal backing sheet, as distinguished from being applied as shown in FIGS. 1 or 4 only between glass and metal backing.

FIG. 7 likewise, shows an alternative form of joint seal. In this, the backing metal sheet is formed with a forwardly turned flange 21 and the sealant 14' is applied between the outer edge surface of the glass panel and the inside surface of the flange.

Structural glass panels the character herein shown have been exhaustively tested and have proven to be entirely satisfactory and effectively accomplish the objects previously stated. Designated areas of glass panels have, in these tests, been heated to high degree while other close areas have been protected. Ordinarily the heated area would have caused the glass to be warped and shattered, but with the present backing sheets of heat conductive metal, the heat was so quickly dissipated through the metal backing and to other areas of the glass that no damage was done.

The primary or principal requirements in the making of such panels is the use of a metal backing of high heat conductivity and the holding of this metal sheet in close contact with all surfaces of the glass panel; this being accomplished in the present instance by vacuumizing the space between glass and metal.

Although I have illustrated and described a sheet metal backing member, it will be appreciated that any material which provides relatively rapid heat conduction may be used as the backing member. Also, any sealant or rubberized mastic which has the required properties or characteristics may be used in lieu of polysulfite rubber sealant which I have found to be satisfactory.

In the drawings, I have illustrated three constructions wherein the glass and backing member are laminated together with an air tight seal about the perimeter. I do not intend that my invention be limited to the constructions illustrated as it will be readily apparent that other means may be employed to seal the edges between the glass and backing member.

What I claim as new is:

1. A structural glass wall panel comprising a flat sheet of glass, a relatively thin, flat sheet of heat conductive backing material of substantially the same dimensions as the sheet of glass, and said sheet of backing material being in engaging contact with the back surface of said glass throughout substantially the entire surface area thereof, a sealant material applied about the entire peripheral edge portion of said glass and said backing material, and a vacuum in the entire area between the contacting surfaces of said glass and said backing material inwardly of said sealant material whereby the contacting surfaces of said glass and backing material are forced into flat and constant engagement by external air pressure.

2. A structural glass panel as in claim 1 wherein said backing material is sheet metal.

3. A structural glass panel as in claim 2 wherein the sheet metal surface engaging the glass surface is painted.

4. A structural glass panel as in claim 2 wherein the back surface of the glass is painted.

5. A structural glass panel as in claim 1 including a binding strip surrounding the peripheral edges of said sheet of glass and said backing material.

6. A structural glass panel as in claim 1 wherein the peripheral portion of said backing material is angularly bent and spaced from the sheet of glass and the sealant material is positioned between said angularly bent portion and the peripheral edges of said glass.

References Cited in the file of this patent

UNITED STATES PATENTS

| | | |
|---|---|---|
| 307,395 | Jones | Oct. 28, 1884 |
| 634,851 | Lindemann | Oct. 10, 1899 |
| 683,164 | Wideen | Sept. 24, 1901 |
| 1,305,492 | Quass | June 3, 1919 |
| 1,734,379 | Hitchcock | Nov. 5, 1929 |
| 1,970,759 | Mattman | Aug. 21, 1934 |
| 2,059,490 | Reisig | Nov. 3, 1936 |
| 2,095,269 | Schuler | Oct. 12, 1937 |
| 2,223,721 | Ernstoff | Dec. 3, 1940 |
| 2,235,680 | Haven et al. | Mar. 18, 1941 |
| 2,402,717 | Winer | June 25, 1946 |
| 2,476,229 | Tobin | July 12, 1949 |
| 2,572,163 | Lamb | Oct. 23, 1951 |
| 2,666,979 | Van Dusen | Jan. 26, 1954 |
| 2,697,675 | Gaiser | Dec. 21, 1954 |
| 2,759,254 | Sochnlen et al. | Aug. 21, 1956 |